Jan. 16, 1940.                R. F. SCHUTZ                2,187,178
                             SPECTACLE CASE
                           Filed Jan. 28, 1939
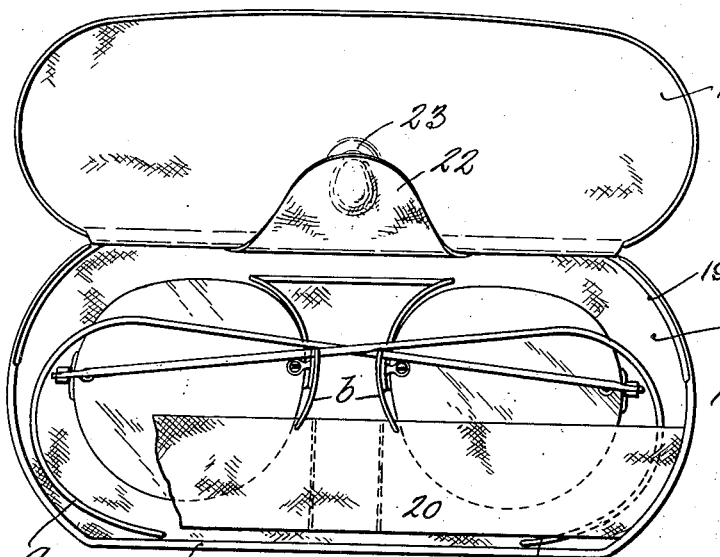
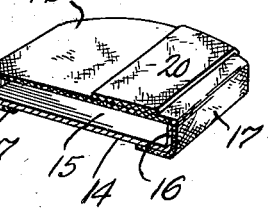
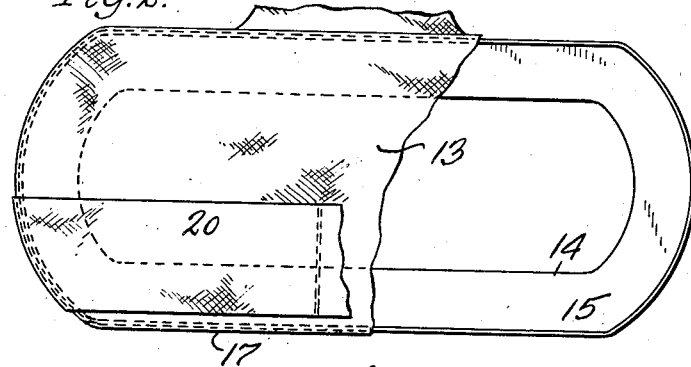
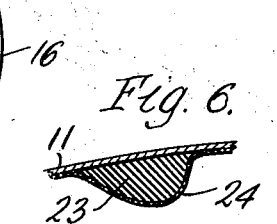
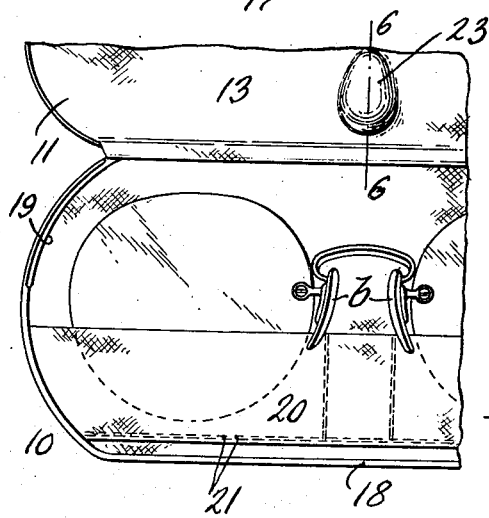
INVENTOR.
Raymond F. Schutz
By
Parker, Rockwood & Farmer.
ATTORNEYS.

Patented Jan. 16, 1940

2,187,178

UNITED STATES PATENT OFFICE 2,187,178

SPECTACLE CASE

Raymond F. Schutz, Buffalo, N. Y.

Application January 28, 1939, Serial No. 253,364

9 Claims. (Cl. 206—6)

This invention relates to improvements in pocket or portable cases for carrying and protecting eyeglasses or spectacles when not in use.

My pending application for U. S. Letters Patent, Serial No. 215,896, filed June 27, 1938, discloses such a case, in which the spectacles lie on a web or piece of flexible or elastic sheet material which extends across the interior of the case and is held taut or under tension between and spaced away from both the top and bottom of the case so as to provide, in effect, a resilient diaphragm on which the spectacles are retained and suspended in the case, out of contact with the walls or rigid parts thereof, in such a way that injurious flatwise or edgewise impact of the glasses with such rigid parts is prevented in the event of the case being dropped or subjected to jar or shock that otherwise might injure the spectacles.

In another pending application for U. S. Letters Patent, filed by me November 16, 1938, Serial No. 240,745, an improved construction for such cases is disclosed, in which a similar flexible or elastic web or diaphragm is mounted and held taut or under tension across the interior of the case on a carrying frame which conforms substantially with the interior peripheral shape of the body of the case, and this frame, with the web fastened thereon, is secured in place in the case. By this construction, the flexible web can be stretched and fastened on the frame while out of the case, and the frame with its attached web then placed and secured as a unit in the case.

The present invention is in the nature of improvements on the construction disclosed in said second application, one object being to simplify and lessen the labor and cost of mounting the resilient supporting web or diaphragm for the spectacles or eyeglasses in the case.

Another object is to provide simple, inexpensive and desirable means for retaining or confining the spectacles or eyeglasses in place on the web or diaphragm so as to prevent edgewise impact of the glasses with any hard or rigid part of the case.

Other objects and advantages of my improvements will be hereinafter pointed out and the novel features of the invention set forth in the appended claim.

In this specification, the term "spectacles" is employed not only to designate eyeglasses of the type commonly called "spectacles", but also to include nose glasses or other eyeglasses except where the context makes it clear that spectacles equipped with side bows or members for holding them on the wearer are intended.

In the accompanying drawing:

Fig. 1 is a plan view of a spectacle case embodying my invention, showing the same open and the upper retaining band for the spectacles being partly broken away.

Fig. 2 is a plan view, partly broken away, of the diaphragm and a slightly modified carrying frame or element therefor, removed from the case.

Fig. 3 is a transverse, sectional view of the case showing the same closed and the spectacles in place therein.

Fig. 4 is a fragmentary, plan view, similar to Fig. 1, but showing a slightly modified construction.

Fig. 5 is a sectional perspective view of the diaphragm and its carrying frame or element removed from the case.

Fig. 6 is a sectional view on line 6—6, Fig. 3.

10 represents a spectacles case which may be of usual or any suitable construction, the case shown comprising a hollow body formed with bottom, side and end walls, and a hinged lid 11, which may be releasably held in closed position by the usual lid spring or other closing or securing means, not shown. The case may be made of sheet metal, sheet fiber or other suitable, relatively thin, but stiff or rigid material, and as usual, the case may be covered exteriorly and lined interiorly with suitable finishing material to enhance its appearance, such covering and lining, however, not being shown in the Fig. 3 section, so as not to complicate or confuse this drawing.

13 indicates the web or diaphragm, which may be formed by a piece of suitable flexible or more or less elastic sheet material, such for example, as thin leather, chamois skin, velvet or elastic webbing. This web is mounted on a carrying frame or element 14 so as to be held taut or under tension across the frame, which preferably conforms substantially in peripheral shape to the interior shape of the body of the case, and is adapted to be secured therein with the web extending across the cavity of the case in a position between and spaced away from the bottom and top walls of the case. The web thus forms, in effect, a resilient diaphragm in the case on which the spectacles may lie and be yieldingly suspended in the case out of contact with the hard or rigid walls or parts thereof.

The element 14, which may be of shallow tray-like shape having a bottom wall 15 and an upright peripheral flange or wall 16 extending around the same, may be formed by pressing, molding or otherwise from sheet metal, sheet fiber, plastic or other suitable material, which will make a light but relatively stiff or rigid carrying element, and it can be made either with a solid bottom or with one or more openings in its bottom to reduce its weight. As shown in Fig. 2, the element has a large, central bottom opening, so that, in effect, it forms an open frame having the upstanding peripheral flange 16 and an inwardly projecting bottom flange formed by the bottom 15. The flexible web is stretched across the frame at the upper edges of its upright peripheral flange 16, and may be fastened to the frame by pulling the marginal portions 17 of the web down around the flange and under the bottom of the frame and securing them to the latter, as by cementing. The web is thus held taut or under tension across the top edges of the frame, above and out of contact with the bottom of the frame, and when the frame with the web mounted thereon, is placed and secured in the case 10, the web will form a resilient diaphragm across the case between and spaced away from the bottom and top or lid walls of the case, on which the spectacles are adapted to lie and be resiliently suspended in the case out of contact with the bottom or top thereof. The web can be properly stretched and secured on the carrying frame, as described, without the use of expensive dies or tools, and with a minimum of labor, thereby materially reducing the cost of production of the case.

The frame 14 carrying the web may be secured in place in the case in any suitable manner, as for instance, by pressing it into the case beneath a holding lip or parts extending inwardly from the marginal walls of the case. In the case shown, which is deeper at its rear than at its front, the front wall of the case is provided with an inbent lip 18 which overhangs the front edge portions of the frame, and the rear and end walls of the case are formed with a bead 19 which overhangs the adjacent edge portions of the frame. In a case having peripheral walls of uniform depth, the peripheral lip could continue around the case, whereas if the case is made deep enough or the web-carrying frame shallow enough, the bead 19 could be continuous around the case. There is sufficient elasticity in the flange of the frame or the walls of the case to enable the frame to be pushed into place in the case with its edges beneath the holding lip or parts, and the tendency of the parts to resume their normal position, will maintain the holding parts of the case in retaining relation to the frame, and thus hold the latter and the resilient web securely in place in the case. While, as described, the carrying frame is secured in the case by interengaging or cooperating parts on the case and frame, the latter could be secured in the case by cementing or in any other suitable way.

The spectacles should be retained on the resilient web so as to be yieldingly supported thereby and held from shifting edgewise thereon, to prevent contact of the edge portions of the spectacles with the walls or rigid parts of the case. For this purpose, as disclosed in my said applications, an upper, flexible band 20, which may be made of material like the web 13, extends lengthwise over the spectacles with its ends secured to the web or frame 14, and the band stitched or otherwise fastened between its ends to the web. The band 20 thus provides two loops or pockets into which the lenses and ends of the bows a of the spectacles are adapted to be inserted forwardly, and holds the spectacles down on the web so as to prevent them from contacting or striking the top or lid of the case. The ends of the band may be fastened to the frame 14 in the same way as the web, or they may be secured in any other suitable way. Also, the band may be fastened along its front edge to the web, as by stitching 21, see Fig. 4, or in any suitable way, to close the bottoms or front edges of the pockets, so that the spectacle lenses cannot protrude forwardly therefrom. The edges of the lenses are thus prevented from striking or contacting with the rigid parts at the front of the case. This latter construction is more suitable for use with nose glasses which have no bows, or for spectacles having relatively straight bows. When the case is used for spectacles having bows with the usual curved ear-engaging ends, these ends may extend forwardly out of the pockets and bear against the front wall of the case without harm, since due to their resilience, they will hold the edges of the lens yieldingly out of contact with the rigid, front parts of the case, as illustrated in Fig. 1.

In addition, means are provided for yieldingly pressing or urging the spectacles forwardly in their retaining pockets and holding the upper edges of the spectacles or lenses from injurious contact or impact with any rigid parts at the rear of the case. These means, as shown in Figs. 1 and 3, comprise a flexible flap 22 which extends forwardly from the rear portion of the case over the upper edge of the spectacles and is attached at its forward end to a hump 23 projecting downwardly from the lid of the case. The flap may be made of flexible material similar to that used for the web 13, and it may be cemented or otherwise fastened to the rear edge portion of the web-carrying frame. The hump 23 may be made of rubber or other suitable yielding material cemented or otherwise secured on the lid of the case, and is preferably of tapering, rounded form adapted, when the lid of the case is closed, to engage against and between the upper end portions of the nose pieces b of the spectacles in such a manner as to urge the spectacles forwardly on the resilient web and thereby yieldingly hold the spectacles out of contact with any rigid parts at the rear of the case.

As illustrated in Figs. 4 and 6, the flap or tongue 22 is dispensed with and the spectacles are yieldingly held down and urged forwardly on the web or diaphragm 13 simply by the camming engagement of the hump 23 with the nose pieces of the spectacles. The hump 23 in either construction shown may consist of a body of rubber or other suitable yielding material fastened on the case lid and covered by the usual lid lining, shown at 24, Fig. 6, so that the hump will not detract from the neat interior finish or appearance of the case.

By the use of the hump on the case lid, either used alone or in conjunction with the flap, the closing of the lid, which in spectacles cases as ordinarily constructed, is releasably held closed by a suitable spring device, functions to hold the spectacles down and forwardly on the web or diaphragm 13, and it is not necessary to separately fasten down the flap or analogous element for properly holding the spectacles down on and from shifting rearwardly on the web or diaphragm.

I claim as my invention:

1. In a case for spectacles, a web-carrying frame in the case and having a peripheral wall extending upwardly from the lower portion of the case adjacent the peripheral walls of the latter, a web of flexible sheet material attached at its marginal portions to said frame and extending across the frame and held under tension between and spaced from the bottom and top walls of the case, said web forming a resilient diaphragm-like support on which the spectacles lie, and means for confining the spectacles on said web with the lenses out of contact with rigid parts of the case.

2. In a case for spectacles, a web-carrying frame in the case and having a bottom wall and a peripheral wall projecting up from said bottom wall adjacent the peripheral walls of the case, a web of flexible sheet material attached at its marginal portions to said frame and extending across the frame and held under tension between and spaced from the bottom and top walls of the case, said web forming a resilient diaphragm-like support on which the spectacles lie, and means for confining the spectacles on said web with the lenses out of contact with rigid parts of the case.

3. In a case for spectacles, a tray-like web-carrying frame in the case and having a bottom wall and an upwardly projecting peripheral flange adjacent the peripheral walls of the case, a web of flexible sheet material attached at its marginal portions to said frame and extending across the frame from the upper edges of said peripheral flange with the web under tension between and spaced from the bottom and top walls of the case, said web forming a resilient diaphragm-like support on which the spectacles lie, and means for confining the spectacles on said web with the lenses out of contact with rigid parts of the case.

4. In a case for spectacles, a web-carrying frame having a bottom and an upstanding peripheral flange and adapted to be secured in the case with said peripheral flange adjacent the peripheral walls of the case, a web of flexible sheet material attached at its marginal portions to said frame and extending across the frame at the upper edges of said flange with the web held under tension and spaced upwardly from the bottom of said frame, said frame with the web attached thereto being insertable as a unit into the case, and said web forming a resilient diaphragm-like support on which the spectacles lie in the case, and means for confining the spectacles on said web with the lenses out of contact with rigid parts of the case.

5. In a case for spectacles, a web-carrying frame having a bottom and an upstanding peripheral flange and adapted to be secured in the case with said peripheral flange adjacent the peripheral walls of the case, a web of flexible sheet material attached at its marginal portions to said frame and extending across the frame at the upper edges of said flange with the web held under tension and spaced upwardly from the bottom of said frame, said frame with the web attached thereto being insertable as a unit into the case, and said web forming a resilient diaphragm-like support on which the spectacles lie in the case, parts on the case cooperating with parts of said frame for securing the frame in the case, and means for confining the spectacles on said web with the lenses out of contact with rigid parts of the case.

6. A case for spectacles comprising a body and hinged lid, a web of flexible sheet material secured at marginal portions thereof in the case at peripheral portions of the case and extending across the cavity of the case with the web held under tension between and spaced from both the bottom and top walls of the case and forming a resilient diaphragm-like support on which the spectacles are adapted to lie, and a projection on said lid which presses against the spectacles and holds them yieldingly on said resilient support out of contact with the walls of the case.

7. A case for spectacles comprising a body and hinged lid, a web of flexible sheet material secured at marginal portions thereof in the case at peripheral portions of the case and extending across the cavity of the case with the web held under tension between and spaced from both the bottom and top walls of the case and forming a resilient diaphragm-like support on which the spectacles are adapted to lie, means for retaining the spectacles on said resilient support out of contact with the front and end walls of the case, and a projection on the lid of the case arranged to bear on the spectacles and urge them forwardly on said resilient support away from the rear wall of the case.

8. A case for spectacles comprising a body and hinged lid, a web of flexible sheet material secured at marginal portions thereof in the case at peripheral portions of the case and extending across the cavity of the case with the web held under tension between and spaced from both the bottom and top walls of the case and forming a resilient diaphragm-like support on which the spectacles are adapted to lie, means for retaining the spectacles on said resilient support out of contact with the front and end walls of the case, and a yielding projection on the lid of the case arranged to press against the nose piece of the spectacles in a way to urge the spectacles forwardly on said yielding support away from the rear wall of the case.

9. In a case for spectacles comprising a body and lid, a web of flexible sheet material secured in said case and extending across the same over the bottom of the case and forming a yielding support on which the spectacles lie, a piece of flexible sheet material extending lengthwise in the case above said web and attached at its forward edge and mid-length portions to said web and forming separate pockets into which the spectacles lenses are adapted to be inserted forwardly; whereby the spectacles lenses are confined in said pockets between said web and piece, and the shifting of the spectacles in its case is opposed.

RAYMOND F. SCHUTZ.